Feb. 12, 1935.  J. MIHALYI  1,991,110
RANGE FINDER FOR CAMERAS
Filed May 31, 1934   2 Sheets-Sheet 1

Inventor:
Joseph Mihalyi,
By Newton M. Perris
Rolla N. Carter
Attorneys

Feb. 12, 1935. J. MIHALYI 1,991,110
RANGE FINDER FOR CAMERAS
Filed May 31, 1934 2 Sheets-Sheet 2
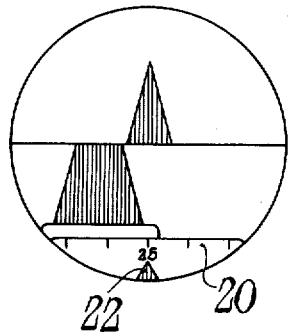
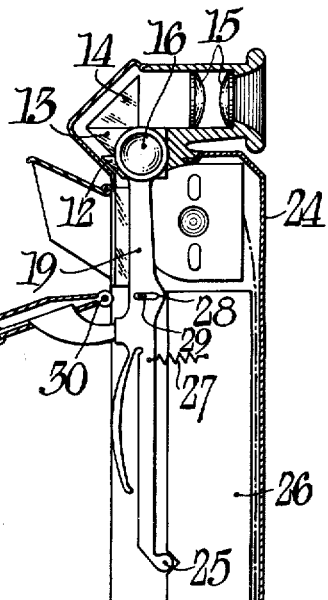
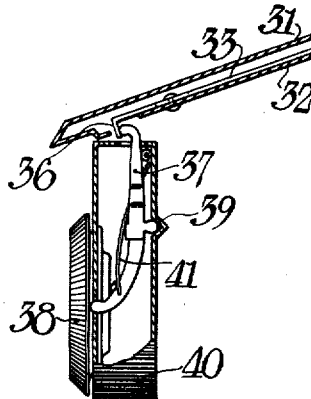
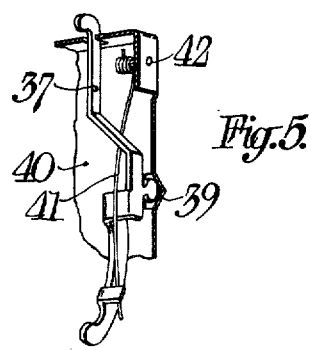

Patented Feb. 12, 1935

1,991,110

UNITED STATES PATENT OFFICE 1,991,110

RANGE FINDER FOR CAMERAS

Joseph Mihalyi, Rochester, N. Y., assignor to Eastman Kodak Company, Rochester, N. Y., a corporation of New York Application May 31, 1934, Serial No. 728,240

4 Claims. (Cl. 95—44)

My present invention relates to photographic apparatus and particularly to cameras in which a movable element of a range finder carried by the camera is coupled to a part of the camera objective which is movable in focusing.

It is an object of my invention to provide a mechanism especially suited for holding hand cameras and which is capable of accurately transmitting the focusing movement of the lens to the movable element of the range finder.

Another object of my invention is the provision of a range scale movable with the adjustable element of the range finder and viewable in a portion of the field of view of the range finder eye-piece.

Other objects and advantages of my invention will appear from the following description when read in connection with the accompanying drawings and its scope will be pointed out in the appended claims.

In the drawings forming a part of this disclosure:

Fig. 3 shows the field of view together with the range scale as viewed through the eye-piece;

Fig. 4 shows the coupling between the range finder and the lens of a folding hand camera; and, Fig. 5 is a view in perspective of a detail of the coupling shown in Fig. 4.

Figure 1:
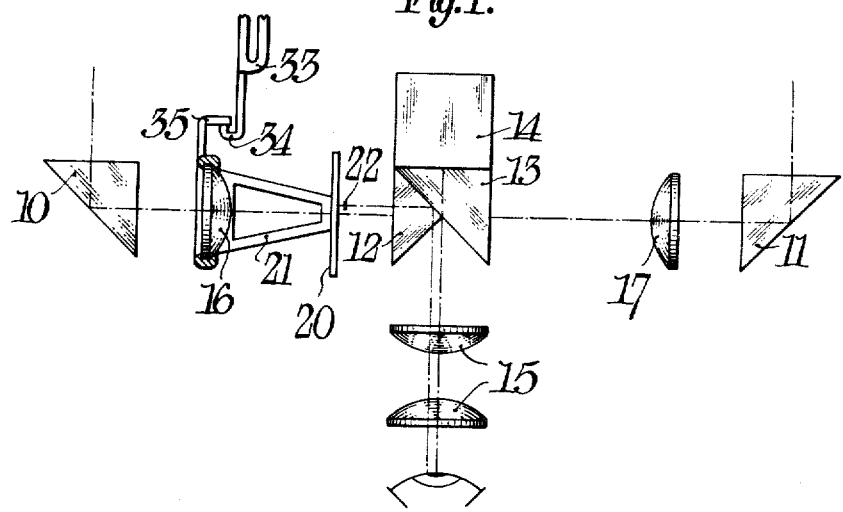
Fig. 1 is a plan view of the range finder optical system.
Figure 2:
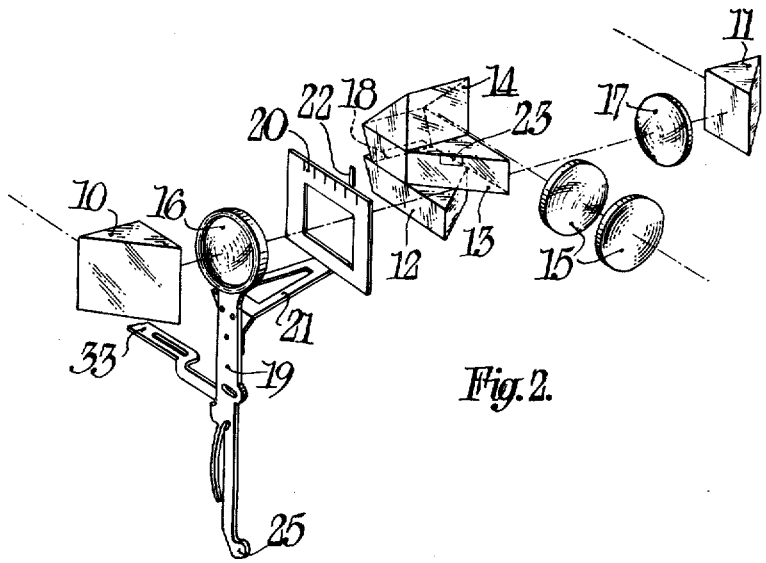
Fig. 2 is a perspective view of the system shown in Fig. 1.

As illustrated the range finder comprises two spaced light reflecting elements such as 90° prisms 10 and 11 forming the base line of the range finder. A coincidence prism erecting system consisting of prisms 12, 13 and 14, cemented together in a well-known manner, is positioned between the prisms 10 and 11 to direct the light into an eye-piece consisting of two lenses 15 for which lenses 16 and 17 form objectives. The objectives 16 and 17 positioned in the base line of the finder are of such focal length as to form their respective images at the lower edge 18 of the prism 10 and 11 to direct the light into an eye-piece consisting of two lenses 15 for which lenses 16 and 17 form objectives. The objectives 16 and 17 positioned in the base line of the finder are of such focal length as to form their respective images at the lower edge 18 of the prism 13 which forms a dividing line between the lower and upper fields as viewed through the eye-piece 15.

In order to deflect one of the beams accepted by the range finder, the objective 16 is carried by an arm 19 which is pivotally mounted in the camera to permit movement of the objective 16 transversely of its optical axis. A translucent range scale 20 carried by a member 21 secured to the arm 19 is supported in position to be viewed through the eye-piece 15 by utilizing a portion of the rear surface of the prism 13 as a reflecting medium to bring the image of the range field 20 into the lower section of the visible field as shown in Fig. 3.

The position of the range scale 20 is such that a sharp image thereof is viewable through the eye-piece 15 simultaneously with the image field of the range finder and the scale thereof is so calibrated that an opaque pointer 22, which may be secured to any suitable part of the camera casing 24, serves to indicate the distance for which the range finder is adjusted. If desired a small portion 23 of this rear surface may be silvered or otherwise treated to make it a more efficient reflector.

As is well-known, a split field coincidence type range finder such as has just been described will produce two horizontally divided images of the field as shown in Fig. 3. These two images are relatively adjustable by moving the objective 16 transversely of its axis and when the images coincide the position of the objective is a function of the distance separating the observer and the object viewed. The range scale 20 is calibrated to translate this position into any desired unit of measurement.

One suitable arrangement for coupling the above range finder to the focusing element of the objective of a folding camera is shown in Fig. 4. In this figure the structural features of the camera forming no part of the present invention are either omitted or shown in a conventional manner. However, enough of the camera structure is shown to enable anyone skilled in the art to understand the invention and to apply it to other cameras of a similar type.

In the form illustrated in Fig. 4 the camera casing 24 carries on its upper end a range finder which is rigidly secured thereto. The arm 19 carrying the movable objective lens 16 of the finder is provided with a rounded end 25 adapted to rest in a notch formed in an inner side wall 26 of the camera casing and kept pressed in the notch by the tension of a coil spring 27 anchored to the wall 26 and secured to the arm 19 intermediate the pivot end 25 and a transverse slot 28 through which extends a pin 29 secured to the camera casing 24 in any suitable manner. The arrangement just described permits a limited amount of movement of the arm 19 about its pivot end 25.

The cover plate hinged at 30 to the camera casing 24 comprises two spaced plates 31 and 32 between which is mounted a link 33 having at one end a bent over portion 34.

As best seen in Fig. 1 the bent over portion 34 of the link 33 engages with a formed up lug 35 on the range finder operating lever 19.

The other end of the link 33 is provided with a turned down end 36 which overhangs and is engaged by the upper end of a lever 37 the lower end of which contacts the focusing mount flange 38 of the camera objective. The lever 37 is pivoted intermediate its end in a notch 39 formed in the rear wall of the lens board 40 and is resiliently held in engagement with the focusing flange 38 by a spring 41 secured to a pin 42 anchored in the lens board 40. It will be understood that any suitable well-known arrangement may be employed for attaching the lens board 40 to the casing 24 so that it may be extended as shown and moved back to the casing when the camera is folded and not in use.

It will be apparent that when the lever 37 is actuated by movement of the focusing flange 38 of the movement is relayed through the coupling link 33 to the arm 19 which causes the objective 16 to move across one beam of the range finder and thereby vary the relative positions of the images in the two fields of view and when these images coincide the camera objective is automatically focused for the distance at which the target seen in the range finder is located.

It will be noted that the coupling between the focusing element of the camera objective and the movable element of the range finder is such that it is positively moved in one direction and moved by spring action in the other direction. Due to the fact that the several elements of this coupling are not fastened together their presence neither interferes with nor complicates the folding and opening of the camera.

Various modifications in the details of the arrangement above described will occur to those skilled in the art and I intend to cover all obvious modifications in the appended claims.

What I claim as new and desire to secure by Letters Patent of the United States is:—

1. In a photographic camera in which the focusing movement of the camera lens produces corresponding movement in an optical element of a range finder carried by the camera, a range finder of the split field coincidence type, a movable optical element for bringing the images of the split field into coincidence, an arm carrying said optical element on one of its ends and having its other end ball pivoted on the camera casing, spring means for holding the ball pivot in contact and for biasing the optical element toward one extreme position, a lens board provided with a lens mount which is movable in focusing the lens, a lever pivoted intermediate its ends on said board and having one of its ends spring pressed against said mount, whereby movement of said mount in focusing is followed by said lever end, a coupling link between the other end of said lever and the arm carrying the movable optical element, and formed up ends on said link for contacting in abutting engagement said other end of the lever and said arm whereby movement of said mount in one direction is positively transmitted to said arm and movement in the other direction is followed by said arm under the influence of said spring means.

2. A folding camera including a casing, a cover plate hinged thereto and a lens board movable out from the casing to a usable position when the camera is open, a lens mount carried by the lens board and having a part movable for focusing, a range finder mounted on the camera casing and provided with an operating lever, and a linkage system including a coupling member carried by said cover plate for relaying the movement of the focusing part of said lens mount to the operating lever of the range finder.

3. The combination with a folding camera and a range finder, of a lens board and a cover plate adapted to swing out into position over the lens board when the camera is open, an operating lever for the range finder, a focusing lens mounted in the lens board, a lever pivoted on the lens board and having one end contacting against a part movable in focusing said lens and having its other end extending above the lens board, and a coupling link carried by said cover plate and having its opposite ends in abutting engagement with the extending end of said pivoted lever and said operating lever, respectively, whereby the camera may be closed as usual without interference from the linkage between the lens and the range finder.

4. The combination of a camera having a focusing lens and a range finder having an operating lever adapted to be actuated in accordance with the movement occurring in adjusting the focus of the lens, said finder including two beam accepting light deflecting elements spaced on opposite sides of a coincidence prism erecting system, an objective lens between each of said deflecting elements and said erecting system, an ocular associated with said erecting system for viewing the two image fields defined by said erecting system and its cooperating objectives, one of said objectives being movable with said operating lever for bringing said image held into coincidence, a fixed pointer, and a translucent scale carried by said operating lever for cooperating with said pointer to give an indication of the range for which the finder is adjusted.

JOSEPH MIHALYI.

CERTIFICATE OF CORRECTION.

Patent No. 1,991,110. February 12, 1935.

JOSEPH MIHALYI.

It is hereby certified that error appears in the printed specification of the above numbered patent requiring correction as follows: Page 2, second column, line 59, claim 4, for "held" read field; and that the said Letters Patent should be read with this correction therein that the same may conform to the record of the case in the Patent Office.

Signed and sealed this 23rd day of April, A. D. 1935.

(Seal)

Leslie Frazer
Acting Commissioner of Patents.